April 25, 1961  H. D. CANAZZI  2,980,924
MOLDED SPEED BOAT HULL
Filed Nov. 6, 1958  2 Sheets-Sheet 1
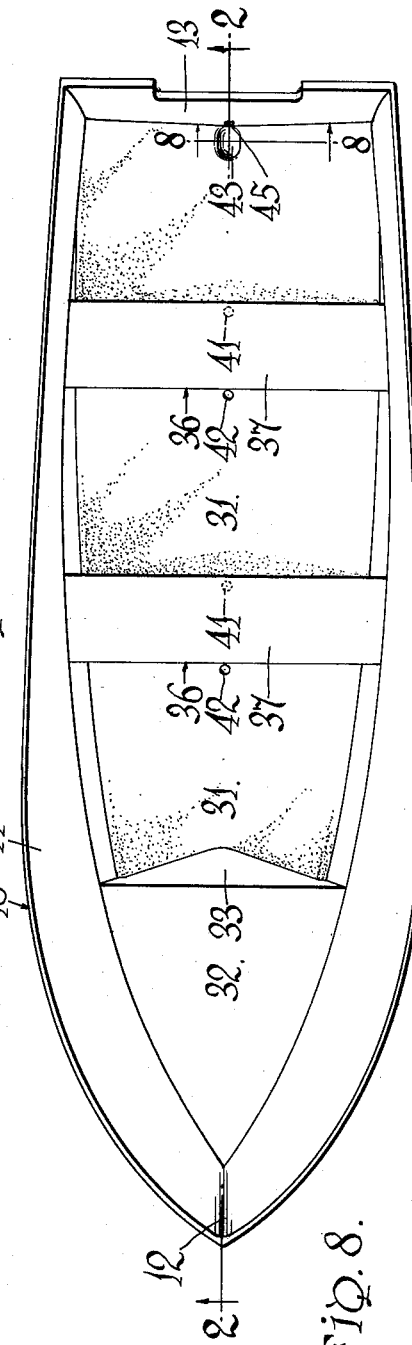
Fig.1.
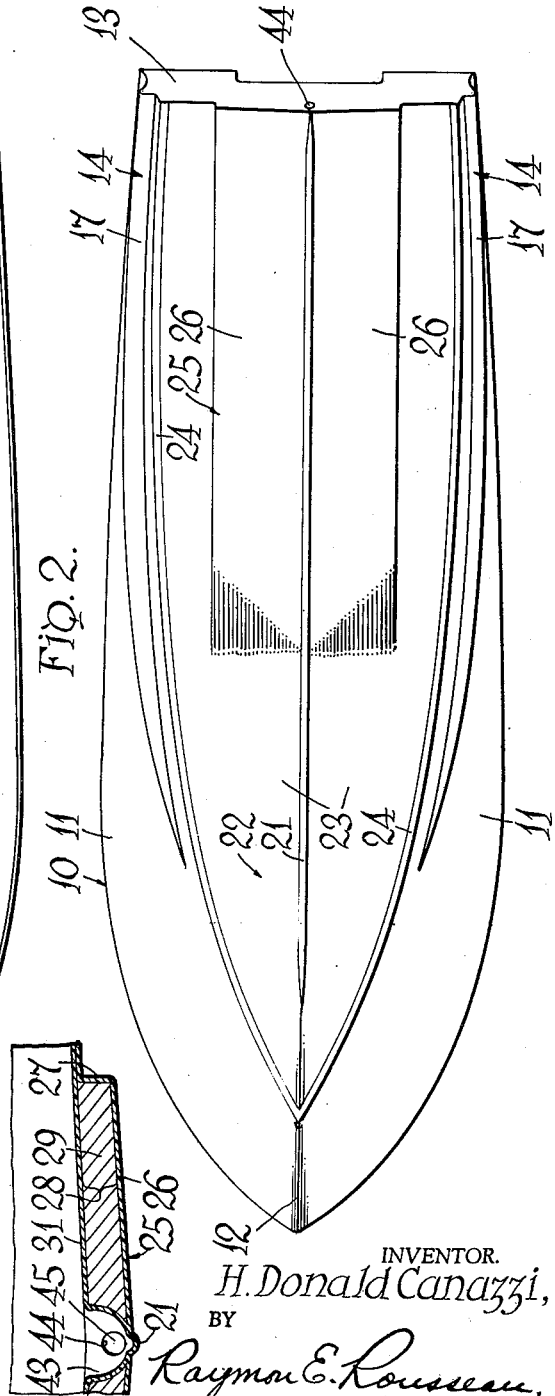
Fig.2.
Fig.8.
INVENTOR.
H. Donald Canazzi,
BY
Raymon E. Rousseau.
ATTORNEY.

April 25, 1961     H. D. CANAZZI     2,980,924
MOLDED SPEED BOAT HULL
Filed Nov. 6, 1958     2 Sheets-Sheet 2
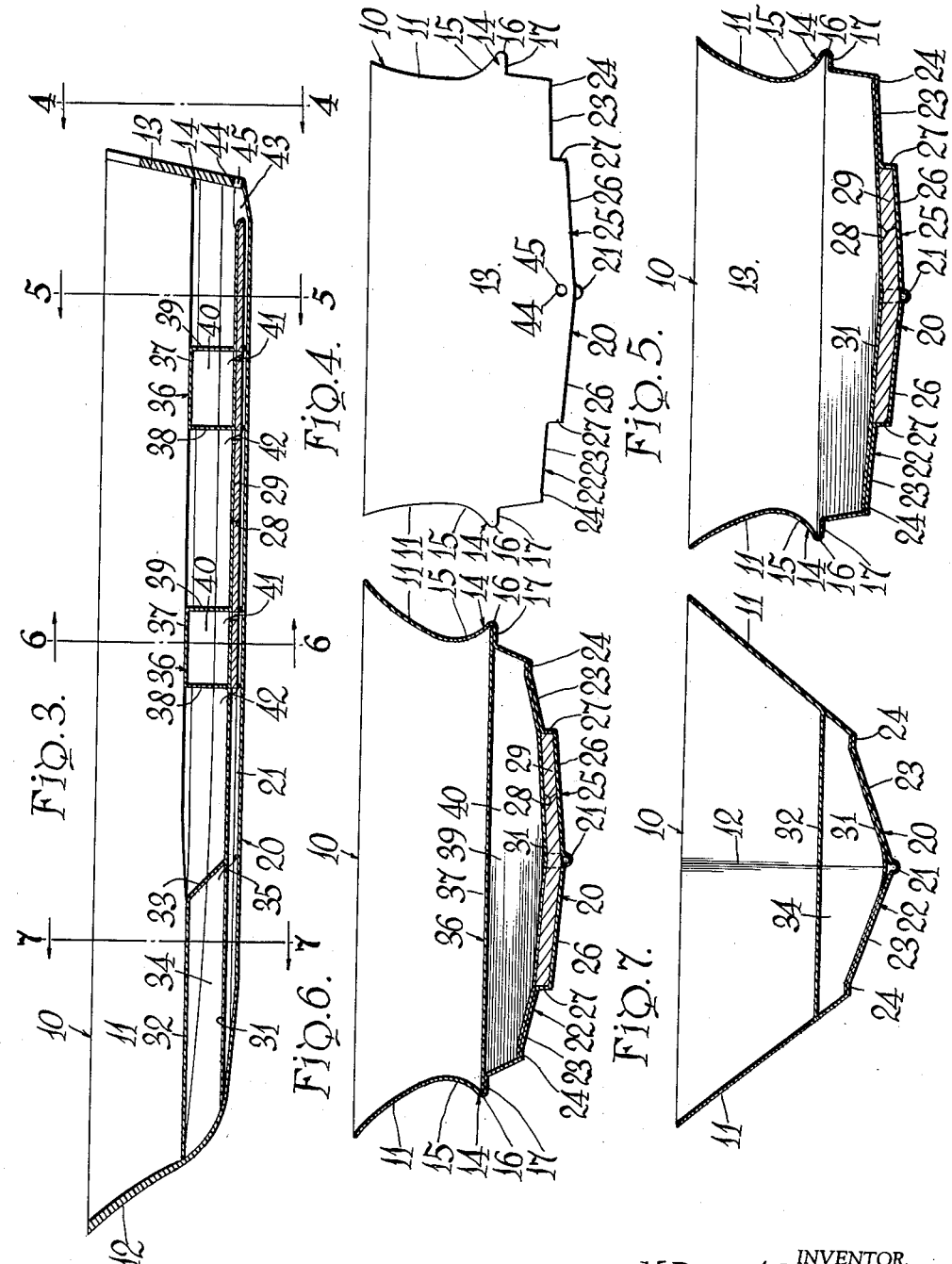
INVENTOR.
H. Donald Canazzi,
BY
Raymon E. Rousseau
ATTORNEY United States Patent Office 2,980,924
Patented Apr. 25, 1961

2,980,924
MOLDED SPEED BOAT HULL
Henry Donald Canazzi, 178 Jewett Parkway, Buffalo, N.Y.
Filed Nov. 6, 1958, Ser. No. 772,351
7 Claims. (Cl. 9—6)

My invention relates to boat hulls and more particularly to molded power driven speed boat hulls formed of fiber glass and plastic.

Heretofore power driven speed boat hulls have been formed of fiber glass and plastic but the construction of these prior hulls has usually followed the conventional hull building practice of providing internal reinforcing ribs and a floor usually spaced from the hull bottom and detachably secured upon the ribs. Hulls thus constructed are costlier to fabricate, are heavy, and waste valuable material and useable space.

The objects of my invention are to provide a molded fiber glass and plastic boat hull which is light and strong, and which has its sides and bottom walls formed and reinforced in a manner to provide a maximum of rigidity and useable space with a minimum use of materials.

Another object is to provide such a boat hull with a plurality of pairs of angularly related planing surfaces formed and arranged on the bottom and side walls of the hull to negotiate the transition from slow speeds, through medium speeds, into high speeds smoothly and quickly, and to attain a higher top speed from a given amount of power than has heretofore been possible by comparable prior hulls.

Another object is to provide such a hull with a plurality of pairs of planing surfaces formed and arranged to improve its maneuverability especially at high speeds, and to improve its stability at all speeds.

Another object is to provide such a hull with a bottom wall formed to receive a reinforcing filler means and a reinforcing floor directly secured upon said wall and filler means, thereby to provide the hull with a strong, rigid and relatively thin bottom wall, which allows more useable space, a lower center of gravity and improved stability.

Another object is to provide such a hull with a hollow keel terminating in an open sump at its aft end and to provide the floor with a plurality of openings in communication with the keel, thereby to drain liquids upon the floor through the openings and keel into the sump for ready removal.

Another object is to provide such a hull with a plurality of spaced floatation chambers one or more of which may be formed and arranged to serve as a combined hull reinforcing floatation tank and passenger seat, and each chamber in communication with the keel to drain thereinto any condensation formed in said chambers.

Another object is to provide each floor area between the chambers with an opening in communication with the keel to drain said areas of any water therein.

These and other subjects of my invention will appear from a perusal of the following detailed description and the drawings, wherein:

Figure 1 is a top plan view of a boat hull constructed in accordance with the principles of my invention.

Figure 2 is a bottom plan view of the hull shown in Figure 1.

Figure 3 is a central longitudinal sectional view taken on the line 2—2 of Figure 1 and shows a plurality of floatation chambers and the floor areas therebetween in communication with a hollow keel for conducting condensation and water therefrom to a sump adjacent the transom.

Figure 4 is an enlarged rear elevational view showing the transom end of the hull.

Figure 5 is an enlarged cross-sectional view taken on the line 5—5 of Figure 3 and shows how the floor and the filler means are formed and directly secured together and to the bottom wall of the hull reinforcing the latter.

Figure 6 is an enlarged cross-sectional view taken on the line 6—6 of Figure 3 and shows a combined floatation tank and passenger seat formed, extended between, and bonded to the side and the bottom walls to further reinforce the hull.

Figure 7 is an enlarged cross-sectional view, taken on the line 7—7 of Figure 3 and shows a bow tank extended between, and bonded to the side and bottom walls to provide another floatation chamber and to reinforce the bow end of the hull.

Figure 8 is an enlarged fragmentary sectional view taken on the line 8—8 of Figure 1 to illustrate how a sump adjacent the transom end of the hollow keel is formed and located to collect condensation and water from the tanks and the floor surfaces.

It will be apparent to those skilled in the art that any one of several different forms and shapes of decking may be secured to and will reinforce the top edge portion of the hull; however for the reasons that the present invention is primarily concerned with the shape and construction of the hull per se, and any showing of a suitable decking would tend to unnecessarily complicate the drawing, no decking has been shown.

Referring now to the drawings, a V-bottom planing type of speed boat hull, generally indicated by the numeral 10 includes a pair of specially shaped side walls 11 and a specially formed bottom wall 20. As shown in Figure 2 the side walls 11 extend between a stem portion 12 and a stern or transom portion 13 and, being longitudinally curved, spaced, and upwardly and outwardly inclined, more or less as indicated in Figures 4 to 7, provide the desired wall shape. Each wall 11, above its lower edge, is formed with an integral outwardly projecting hollow rib 14. The ribs 14 extend forwardly along each side wall from the transom end of the hull for the major portion of its length and, being formed with an outwardly curved upper portion 15 merging into a rounded outer portion 16 in turn merging into a relatively flat bottom portion 17, are shaped to perform the functions of chines, served to stiffen their side wall, and the flat bottom surfaces of the portions 17 act as planing surfaces during slow forward motion of the hull.

The bottom wall 20 comprises a hollow keel portion 21 located midway between the sides of a medium speed planing wall 22 and a high speed planing wall 25.

The medium speed planing wall 22 is formed by an angularly related pair of wall sections 23, the outer sides of each of which integrally adjoin the bottom edge of one of the side walls and the inner sides of which each integrally adjoin one side of the keel portion 21. The angular relation between the walls 23 is obtuse and varies from the transom forwardly as shown in Figures 4 to 7 so that the included angle between the walls 23 at the transom end is greater than at the bow end of the hull, whereby at medium forward speed the hull planes on the wall 22 independently of the planing surfaces 17.

As indicated by the numeral 24 the outer marginal edge portion of each wall 23 adjacent to its junction with the associated side wall 11, is formed to extend outwardly and downwardly thereby acting to deflect water and water spray away from its side wall so that such water and water spray does not enter and wet the hull.

The high speed planing wall 25 is formed as a downwardly offset portion of the medium speed planing wall 22 by a pair of angularly related wall sections 26, the inner side of each of which integrally adjoins and extends outwardly and upwardly from one side of the keel 21 at a predetermined angle and for a predetermined distance. The outer edges of the walls 26, being substantially parallel and downwardly offset from the walls 23, are each integrally connected to the associated wall 23 by a substantially upright integral wall 27.

It has been learned by considerable experimentation that when the height of the walls 27 is in the order of two inches, the width of the wall 25 is slightly more than one half of the beam, and its length is approximately one half of the length of the hull, the offset area of the wall 25 is sufficient to support the hull independently of the other planing surfaces during high forward speeds. A hull formed in the above described manner has a relatively small area high speed planing surface and since the resistance or drag of a hull to forward motion is directly proportional to the wetted area of the hull, the present hull is capable of attaining a higher top speed from a given amount of power than has heretofore been possible.

To prevent the forward end of the downwardly offset wall 25 from interfering with forward motion of the hull, the forward ends of each of the walls 26 and 27 are upwardly and forwardly curved to meet and merge with the associated wall 23, as indicated by the shading in Figure 2, thereby allowing the hull to smoothly effect the transition from a medium speed into a higher speed and to attain its higher top speed.

It will be apparent to those skilled in the art that while the improved shape and form of the hull walls described above will allow a higher top speed, its relatively thin walls will have to be reinforced to retain their shape and form, especialy, at higher speeds. For this reason, other important features of the present invention reside in reinforcing the walls of the hull in a manner to provide the desired rigidity by using a minimum of costly reinforcing materials and in providing a maximum of useable space, comfort and safety for occupants of the hull.

Accordingly the space 28 is formed within the hull by downwardly offsetting the medium speed planing wall 22 to provide the higher speed planing wall 25, is filled with a filler material 29 which overlies the hollow keel, which is bonded in place, and which has a strength, lightness and buoyancy approximating that of balsa wood. A plastic impregnated fiber glass floor 31 overlies and is directly bonded to the top surface of the filler material 29, as shown in Figures 5 and 6, so that the filler material and the floor cooperatively reinforce and stiffen the high speed planing wall 25 to effectively resist the pounding effect of water thereagainst.

The floor 31 also overlies and is directly bonded to the remaining entire inner surface of the medium speed planing wall (Figures 3, 5, 6 and 7) and thus serves to adequately reinforce and stiffen this wall without resorting to the use of the usual floor supporting reinforcing ribs. By thus directly securing the floor 31 upon the filler 29 and the wall sections 23, the cost of ribs and the space lost when ribs are used is saved, and, since the floor 31 is located lower in the hull it has a lower center of gravity and an appreciably improved stability.

As best seen in Figures 1 and 7 the side edges of a horizontally disposed wall 32 are shaped to fit between and are bonded to the inner surfaces of the low end of the side walls 11 substantially in the plane of the ribs 14 and the rear edge of the wall 32 is formed with a downwardly extending wall 33 which is shaped to fit between the side walls 11 and upon the floor 31 and is bonded thereto, whereby the walls 32 and 33 serve to stiffen and reinforce the bow end of the hull and together with the side walls 11 and the floor 31 provide a floatation chamber 34. The floor 31 adjacent and midway between the ends of the wall 33 is formed with a hole 35 to establish open communication between the chamber 34 and the keel, so that any condensation which is formed in the chamber will drain into the keel. Rearwardly of the floatation chamber 34 the hull is provided with one or more, in the present instance two transversely disposed passenger seats 36 the ends of which fit between and are bonded to the side walls 11 (Figure 6). As best seen in Figure 3, the seats 36 are each preferably formed with a seat forming top wall 37 and spaced front and rear walls 38 and 39 shaped to fit between the side walls and upon the floor 31 and are bonded thereto. The walls 37, 38 and 39 thus serve to stiffen and reinforce the side and bottom walls of the hull and together with the side walls and the floor provide the additional floatation chambers 40. The floor and filler material adjacent and midway between the ends of each rear wall 39 are each formed with alined holes, as at 41, to communicate with the keel, thereby to drain any condensation formed in the floatation chambers 40 into the keel.

In order to drain any water from the floor space between the bow and the forward chamber and from the floor space between the forward and rear chambers into the keel, the holes 42, which communicate with the keel, are provided.

It is contemplated that the floatation chambers 34 and 40 may be completely filled with a bubble-type polystyrene plastic material made by inflating cells of the polystyrene with air, either within the chambers or elsewhere, so that this material will not only reinforce the chambers but will also prevent formation of condensation therein, and for this reason, will obviate the need for the chamber draining holes 35 and 41.

The space 28 may also be filled and reinforced by a bubble-type polystyrene which, however, must and can be prevented from entering, filling and blocking the hollow keel 21 and the floor draining holes 42, as by simply forming and placing a section of tubing in the keel 21 to establish and maintain open communication between the floor area draining holes 42 and the sump 43.

Referring to Figures 1, 3 and 8 it will be seen that a sump 43 is formed at the transom end of the keel so that any condensation and water draining into the keel will run into the sump 43 and may be readily removed therefrom. To facilitate removal of liquids from the sump the transom adjacent the sump is provided with a hole 44 normally closed by a removable plug 45 so that when the hull is moving forwardly and the plug is removed liquids are sucked from the sump automatically.

It should be understood that the herein shown and described form of hull is intended to exemplify the principles of my invention and that various modifications and rearrangements of its component parts may be made within the scope of the appended claims, wherein I claim:

1. A unitary V-bottom type of speed boat hull molded of resin impregnated fibre glass comprising a pair of side walls each formed with an integral outwardly projecting chine-like hollow rib located above the junction of the side wall with a bottom wall and extending along its side wall from the stern end of the hull forwardly for the major portion of its length, each of said ribs being formed with a relatively flat lower surface serving as a slow speed planing surface during slow forward speed of the hull; and a bottom wall integrally formed with a longitudinally central hollow keel portion extending downwardly therefrom; a medium speed planing surface and a high speed planing surface; said medium speed planing surface being formed of a pair of upwardly and outwardly extending angularly related wall sections each having their outer side adjoined to one side of the forward portion of the keel and extending to the stern end of the hull, the angular relation of said wall sections being progressively increased from the bow rearwardly to said stern end, whereby at medium forward speeds the hull planes on said medium speed planing surfaces; and said high speed planing surface being located at the rear half of the hull and formed of a pair of substantially flat upwardly and outwardly extending angularly related wall sections having a combined surface area approximating one half the area of the bottom wall, and each having their inner side adjoined to one side of the keel, their outer side adjoined in downwardly offset relation to the associated medium speed surface by an upright wall and their forward ends faired into said associated surface, whereby at high forward speeds the hull planes on said high speed planing surface substantially independently of the other surfaces and attains a higher top speed from a given amount of power.

2. A speed boat hull as set forth in claim 1 wherein the outer side marginal portions of the medium speed planing wall are each inclined outwardly and downwardly and integrally adjoin one of the side walls of the hull, whereby said inclined marginal portions serve to deflect water away from the side walls and prevent it from entering and wetting the hull.

3. A speed boat hull as set forth in claim 1 wherein the outer sides of the substantially upright walls are substantially parallel and the forward end of each of said upright walls and each section of the high speed planing surface are formed to smoothly adjoin the associated section of the medium speed planing surface, thereby to cause the hull to smoothly effect the transition between its medium and high speeds.

4. A speed boat hull as set forth in claim 1 wherein a floor is directly bonded to the entire inner surface of the medium speed planing walls in overlying spaced relation to the high speed planing surfaces and the space therebetween is provided with a strong stiff and light material for reinforcing and stiffening said planing surfaces and the floor surface thereabove.

5. A speed boat hull as set forth in claim 4 wherein the bow end of the hull is reinforced by a wall member spaced above the floor and formed to fit between the side walls and upon the floor with its edges bonded to said side walls and floor, thereby providing the hull with an integral hollow bow floatation tank, and the floor is provided with an opening establishing communication between the tank and the hollow keel, whereby condensation formed in the tank drains into the keel.

6. A speed boat hull as set forth in claim 5 wherein the side and bottom walls of the hull intermediate its bow and stern ends are further reinforced by a transverse seat formed with a top and spaced front and rear walls having their edges bonded to the side walls and to the floor, thereby providing another hollow floatation tank and the floor and the floor reinforcing material are provided with an opening establishing communication between the seat tank and the hollow keel, whereby condensation formed in the seat tank drains into the keel.

7. A speed boat hull as set forth in claim 6 wherein the floor area between the hull reinforcing floatation tanks and the floor and high speeding planing surface reinforcing material are provided with an opening establishing communication with the keel, whereby any water upon said floor area drains into the keel, and the stern end of the keel terminates in an open sump formed in the floor to collect and allow ready removal of the liquids collected therein.

References Cited in the file of this patent

UNITED STATES PATENTS

| | | |
|---|---|---|
| 270,519 | Vaughan | Jan. 9, 1883 |
| 523,151 | Perkins | July 17, 1894 |
| 1,084,401 | Cooper | Jan. 13, 1914 |
| 1,782,868 | Deetjen | Nov. 25, 1930 |
| 2,196,217 | Latty | Apr. 9, 1940 |
| 2,366,035 | Leone | Dec. 26, 1944 |
| 2,376,753 | Bowen | May 22, 1945 |
| 2,379,883 | Clement | July 10, 1945 |
| 2,582,228 | Brinkema | Jan. 15, 1952 |
| 2,617,126 | Nebesar | Nov. 11, 1952 |
| 2,655,121 | Cuneo | Oct. 13, 1953 |
| 2,677,139 | Canazzi | May 4, 1954 |
| 2,866,985 | Blackmore | Jan. 6, 1959 |
| 2,887,978 | Tritt | May 26, 1959 |

FOREIGN PATENTS

| | | |
|---|---|---|
| 82,678 | Sweden | Feb. 19, 1935 |
| 306,676 | Great Britain | Feb. 28, 1929 |
| 471,741 | Great Britain | Sept. 10, 1937 |